US006096443A

United States Patent [19]

Malhotra et al.

[11] Patent Number: 6,096,443

[45] Date of Patent: Aug. 1, 2000

[54] TRANSPARENCIES

[75] Inventors: Shadi L. Malhotra; Kirit N. Naik, both of Mississauga, Canada

[73] Assignee: Xerox Corporation, Stamford, Conn.

[21] Appl. No.: 09/118,446

[22] Filed: Jul. 17, 1998

[51] Int. Cl.[7] .......... B32B 9/00

[52] U.S. Cl. .......... 428/690; 428/195; 428/480; 428/500; 428/532

[58] Field of Search .......... 428/195, 211, 428/500, 532, 332, 690

[56] References Cited

U.S. PATENT DOCUMENTS

| | | | |
|---|---|---|---|
| 4,956,225 | 9/1990 | Malhotra | 428/216 |
| 4,997,697 | 3/1991 | Malhotra | 428/195 |
| 5,202,205 | 4/1993 | Malhotra | 430/17 |
| 5,244,714 | 9/1993 | Malhotra et al. | 428/195 |
| 5,320,902 | 6/1994 | Malhotra et al. | 428/342 |
| 5,482,812 | 1/1996 | Hopper et al. | 430/137 |
| 5,672,424 | 9/1997 | Malhotra et al. | 428/325 |

*Primary Examiner*—Bruce H. Hess
*Assistant Examiner*—Michael E. Grendzynski
*Attorney, Agent, or Firm*—E. O. Palazzo

[57] ABSTRACT

A coated transparency comprised of a substrate with four hydrophilic coating layers, two coating layers on the front side of the substrate and two coating layers on the reverse side of the substrate, wherein said front side coatings are comprised of an antistatic hydrophilic layer in contact with the substrate comprised of a blend of (1) a hydrophilic binder, (2) a water soluble acid salt, (3) a cationic component, and (4) a biocide, and the second coating situated on top of the first coating is comprised of (1) a binder formed from a latex, (2) a toner wetting agent, (3) a lightfast UV absorber, (4) a lightfast antioxidant, and (5) a lightfast antiozonant compound; and wherein said two coatings in contact with the reverse side of the substrate are comprised of a third hydrophilic antistatic luminescent coating comprised of a blend of (1) a hydrophilic binder, (2) a water soluble acid salt, (3) a cationic component (4) a luminescent component and (5) a biocide, and the fourth coating situated on top of the third coating is comprised of (1) a binder formed from a latex, (2) a toner wetting agent, (3) a lightfast UV absorber, (4) a lightfast antioxidant, and (5) a lightfast antiozonant compound.

22 Claims, No Drawings

TRANSPARENCIES

PENDING APPLICATIONS

There are illustrated in copending application U.S. Ser. No. 09/118,459, filed concurrently herewith, the disclosure of which is totally incorporated herein by reference, coated substrates, and more specifically, a substrate with four layers, two coating layer substrates on the front side of the substrate and two coating layers on the reverse side of the substrate, wherein the front side coatings are comprised of a antistatic hydrophilic layer in contact with the substrate comprised of (1) a hydrophilic binder, (2) a water soluble filler, (3) a water insoluble filler, (4) an antistatic component (5) an optional filler dispersant, and (6) an optional biocide, and a second hydrophobic toner receiving coating situated on top of the first coating comprised of (1) a binder, (2) a toner wetting agent, (3) a lightfast UV absorber, (4) a lightfast antioxidant/antiozonant compound, and (5) a filler; and wherein the two coatings in contact with the reverse side of the substrate are comprised of a third hydrophilic antistatic coating comprised of (1) a binder polymer, (2) a water soluble filler, (3) a water insoluble filler, (4) an antistatic agent, (5) an optional filler dispersant and (6) an optional biocide, and a fourth toner receiving coating layer on top of the third hydrophilic coating comprised of (1) a latex binder, (2) a toner wetting agent, (3) a lightfast UV absorber, (4) a lightfast antioxidant compound, (5) a lightfast antiozonant compound, (6) an optional filler, and (7) an optional biocide.

Also, there is illustrated in copending application U.S. Ser. No. 09/118,573, filed concurrently herewith, the disclosure of which is totally incorporated herein by reference, a composition comprised of a solvent, a polymeric binder, a dye mordant, a substantially water soluble anticurl compound, a substantially water soluble desizing compound, a lightfastness compound, a defoamer, an optional biocide, and an optional filler.

There also is illustrated in copending application U.S. Ser. No. 09/118,961, filed concurrently herewith, the disclosure of which is totally incorporated herein by reference, a transparency comprised of a supporting substrate, and thereover two coatings, (1) a first heat dissipating coating layer in contact with the substrate, and wherein the first coating is comprised of a heat dissipating binder optionally with a melting point in the range of from between about 100° C. to about 260° C. and an antistatic compound; and (2) a second ink receiving coating layer thereover comprised of a blend of a binder polymer, and an alkylated oxazoline, a lightfast UV compound, and an optional biocide.

The appropriate components and processes of the copending applications may be selected for the present invention in embodiments thereof.

BACKGROUND OF THE INVENTION

The present invention is directed to coated recording sheets such as transparencies and papers. More specifically, the present invention is directed to coated transparent recording sheets particularly suitable for use in electrophotographic and ink jet printing processes, and yet more specifically, the present invention is directed to xerographic and ink jet printable coated recording sheets such as transparencies comprised of a plastic substrate such as a polyester such as MYLAR®; (1) a first hydrophilic antistatic coating on the front surface of the substrate, (2) a second hydrophilic ink/toner receiving coating on the top of the first hydrophilic coating and capable of wetting and spreading the toner, (3) a third hydrophilic antistatic image enhancing coating on the backside of the substrate, and (4) a fourth hydrophilic ink/toner receiving coating in contact with the third antistatic coating on the back/reverse side of the substrate.

Specifically the present invention is directed to a method of preparing porous low haze, as measured with a XL-21 Hazegard, Hazemeter, and which low is for example, less than about 10, and more specifically, from about 3 to about 10, as measured by subtracting the value of transmittance of light through a transparency from 100, thus if the transmittance is 90, the haze value is 10, coated transparencies comprised of a supporting plastic substrate with two coating layers on the front side and two coating layers on the reverse side of the substrate; wherein the front side coatings are comprised of a first antistatic hydrophilic layer in contact with the substrate, and a second hydrophilic ink/toner receiving coating situated on top of the first coating and wherein the two coatings in contact with the reverse side of the substrate are comprised of a third hydrophilic antistatic luminescent coating in contact with the substrate, and a fourth hydrophilic ink/toner receiving layer on top of the third hydrophilic antistatic coating. The primary function of the back coatings is to prevent unnecessary transparency curling, for example values of more than about 25 millimeters are not usually considered acceptable, before and after ink jet printing with aqueous inks. Furthermore, the back coatings primarily enable for example the proper feeding of the transparencies in xerographic copiers, and avoidance, or minimization curling during the hot roll image fusing process. Moreover, in view of the presence of luminescent materials in the third coating the image density on the ink/toner layer is enhanced, for example, when the backgrounds are luminescent and colored such as magenta or yellow, the optical density values of the background adds up to the values of the optical density values of the image, thus these images appear brighter, such as on a yellow fluorescent background. The two front coatings can be applied simultaneously using a two slot die and dried at by heating such as heating at about 100 to about 125° C. The two back coatings can also be applied with a two slot die and are preferably dried by heating such as heating at about 140 to about 200, and more specifically about 150° C. to remove any excess trapped moisture remaining in the front coatings.

PRIOR ART

U.S. Pat. No. 4,956,225 discloses a transparency suitable for electrographic and xerographic imaging which comprises a polymeric substrate with a toner receptive coating on one surface thereof comprising blends selected from the group consisting of poly(ethylene oxide) and carboxymethyl cellulose; poly(ethylene oxide), carboxymethyl cellulose, and hydroxypropyl cellulose; poly(ethyleneoxide) and vinylidene fluoride/hexafluoro propylene copolymer; poly (chloroprene) and poly(alphamethyl styrene); poly (caprolactone) and poly(alpha-methylstyrene); poly (vinylisobutylether) and poly(alpha-methylstyrene); poly (caprolactone) and poly(p-isopropyl alpha-methylstyrene); blends of poly(1,4-butylene adipate) and poly(alpha-methylstyrene); chlorinated poly(propylene) and poly (alpha-methylstyrene); chlorinated poly(ethylene) and poly (alpha-methylstyrene); and chlorinated rubber and poly (alpha-methylstyrene). Also disclosed are transparencies with first and second coating layers.

U.S. Pat. No. 4,997,697 discloses a transparent substrate material for receiving or containing an image which comprises a supporting substrate base, an antistatic polymer layer coated on one or both sides of the substrate and comprising hydrophilic cellulosic components, and a toner receiving polymer layer contained on one or both sides of the antistatic layer, which polymer comprises hydrophobic cellulose ethers, hydrophobic cellulose esters, or mixtures thereof, and wherein the toner receiving layer contains adhesive components.

U.S. Pat. No. 5,202,205, the disclosure of which is totally incorporated herein by reference, illustrates a transparent substrate material for receiving or containing an image comprising a supporting substrate, an ink toner receiving coating composition on both sides of the substrate and comprising an adhesive layer and an antistatic layer contained on two surfaces of the adhesive layer, which antistatic layer comprises mixtures or complexes of metal halides or urea compounds both with polymers containing oxyalkylene segments.

U.S. Pat. No. 5,244,714, the disclosure of which is totally incorporated herein by reference, discloses a recording sheet which comprises a base sheet, an antistatic layer coated on at least one surface of the base sheet comprising a mixture of a first component selected from the group consisting of hydrophilic polysaccharides and a second component selected from the group consisting of poly(vinyl amines), poly(vinyl phosphates), poly(vinyl alcohols), poly(vinyl alcohol)-ethoxylated, poly(ethylene imine)-ethoxylated, poly(ethylene oxides), poly(n-vinyl acetamide-vinyl sulfonate salts), melamine-formaldehyde resins, urea-formaldehyde resins, styrene-vinylpyrrolidone copolymers, and mixtures thereof, and at least one toner receiving layer coated on an antistatic layer comprising a material selected from the group consisting of maleic anhydride containing polymers, maleic ester containing polymers, and mixtures thereof.

U.S. Pat. No. 5,672,424, the disclosure of which is totally incorporated herein by reference, discloses a transparency comprised of a supporting substrate, thereover a first coating layer comprised of an ink absorbing layer and a biocide; and a second ink spreading coating layer comprised of a hydrophilic vinyl binder, a dye mordant, a filler, an optional lightfast agent and an ink spot size increasing agent selected from the group consisting of hydroxy acids, amino acids and polycarboxyl acids; and wherein the first coating is in contact with the substrate and is situated between the substrate and the second ink coating, and which transparency possesses a haze value of from about 0.5 to about 10 and a lightfast value of from about 95 to about 98.

While the above materials and processes are suitable for their intended purposes, a need remains for transparencies with bright, that is for example, reflecting a relatively greater amount of light by about 10 percent more, images particularly suitable for use in electrophotographic and ink jet printing applications. In addition, a need remains for transparencies with improved ink-wetting capabilities, that is for example, the contact angle of the inks on the surfaces of the transparencies is lowered from a conventional about 500 to between about 25 and about 30° and which transparencies can be selected with liquid inks to yield rapid drying of images. In addition, a need remains for transparencies having improved toner-wetting capability which can be employed with xerographic toners so that the heat and energy required for fusing the toner to the transparency is reduced. Further, a need remains for transparencies which can be selected for xerographic toners so that jamming of the transparencies in the fusing apparatus is reduced. Additionally, there is a need for transparencies suitable for use in electrophotographic applications with reduced fusing energy requirements and reduced jamming, and wherein the transparency sheets also exhibit acceptable image quality and improved image fix to the transparency.

SUMMARY OF THE INVENTION

It is an feature of the present invention to provide a xerographic transparencies with a number of advantages.

It is another feature of the present invention to provide transparencies with bright images particularly suitable for use in electrophotographic and ink jet printing applications.

It is yet another feature of the present invention to provide transparencies having improved ink-wetting capability with liquid inks to prevent the rapid drying of images.

It is yet another feature of the present invention to provide xerographic transparencies having improved toner-wetting capability which can be employed with xerographic toners so that the heat and energy required for fusing the toner to the xerographic transparency is reduced to from about 155° C. to about 140° C.

It is still another feature of the present invention to provide xerographic transparency which can be employed with xerographic toners so that jamming in the fusing apparatus is reduced.

Another feature of the present invention is to provide xerographic transparency suitable for use in electrophotographic applications with reduced fusing energy requirements and reduced jamming, wherein the xerographic transparency also exhibit acceptable image quality and improved image fix.

These and other features of the present invention can be accomplished in embodiments thereof by providing transparencies with coatings thereover and thereunder.

Aspects of the present invention include a transparency comprised of a substrate with coating layers on the front side of the substrate and coating layers on the reverse side of the substrate, wherein the front side coatings, for example, are comprised of an antistatic hydrophilic layer in contact with the substrate and which layer is comprised of a blend of (1) a hydrophilic binder, (2) a water soluble acid salt, (3) a cationic component, and (4) a biocide, and a second coating situated on top of the first coating comprised of (1) a latex binder, (2) a toner wetting agent, (3) a lightfast UV absorber, (4) a lightfast antioxidant, and (5) a lightfast antiozonant compound; and wherein the coatings in contact with the reverse side of the substrate are comprised of a third hydrophilic antistatic coating comprised of a blend of (1) a hydrophilic binder, (2) a water soluble acid salt, (3) a cationic component (4) a luminescent component and (5) a biocide, and the fourth coating situated on top of the third coating is comprised of (1) a latex binder, (2) a toner wetting agent, (3) a lightfast UV absorber, (4) a lightfast antioxidant, and (5) a lightfast antiozonant compound; a transparency wherein the substrate is selected from the group consisting of (1) polyethylene terephthalate, (2) polyethylene naphthalate, (3) polycarbonate, (4) polysulfone, (5) polyether sulfone, (6) poly(arylene sulfone), (7) cellulose triacetate, (8) polyvinyl chloride, (9) cellophane, (10) polyvinyl fluoride, (11) polypropylene, and (12) polyimide; a transparency wherein in the first hydrophilic coating layer the binder is present in amounts of from about 90 parts by weight to about 30 parts by weight, the water soluble salt is present in an amount of from about 5 parts by weight to about 40 parts by weight, the cationic component present in an amount of from about 4 parts by weight to about 25 parts by weight, and the biocide is present in an amount of from about 1 part by weight to about 5 parts by weight and wherein the total parts of all components is about 100; a transparency wherein the hydrophilic binder of the first antistatic coating is (1) hydroxypropyl methyl cellulose, (2)

hydroxypropyl hydroxyethyl cellulose, (3) diethylammonium chloride hydroxy ethyl cellulose, (4) hydroxypropyl trimethyl ammonium chloride hydroxyethyl cellulose, (5) poly(2-acrylamide2-methyl propane sulfonic acid), or (6) poly(N,N-dimethyl-3,5-dimethylene piperidinium chloride); a transparency wherein the hydrophilic binder is hydroxypropyl hydroxyethylcellulose, or diethylammonium chloride hydroxy ethyl cellulose; a transparency wherein the acid salt of the first layer is selected from the group consisting of (1) (R)-(−)-3-pyrrolidinol hydrochloride, (2) 2,5-dimethoxy-4-morpholinoaniline dihydrochloride, (3) 3-amino-1H-iso indolehydrochloride, (4) (S)-(+)-2-amino-3-cyclohexyl- 1-propanol hydrochloride, and (5) 2,3-diamino propionic acid monohydrochloride; a transparency wherein the acid salt is (1) (R)-(−)-3-pyrrolidinol hydro chloride, (2) 2,5-dimethoxy-4-morpholinoaniline dihydrochloride; a transparency wherein the dry thickness of the first layer is about 0.5 micron to about 25 microns; a transparency wherein the binder is present in an amount of from about 76 parts by weight to about 54 parts by weight, the toner wetting agent is present in an amount of from about 8 parts by weight to about 40 parts by weight, the lightfast UV absorber compound is present in an amount of from about 8 parts by weight to about 0.5 part by weight, the lightfast antioxidant is present in an amount of from about 4 parts by weight to about 0.25 part by weight, and the lightfast antiozonant compound is present in an amount of from about 4 parts by weight to about 0.25 parts by weight; a transparency wherein the latex binder is selected from the group consisting of (1) sodiosulfo substituted anionic polyester latex (2) styrene-butadiene latexes, (3) styrene-butylacrylate copolymer and (4) butadiene-styrene-2-vinyl pyridine terpolymer latex; a coated transparency wherein said latex contains a butadiene-styrene-2-vinyl pyridine terpolymer polymer and water; a transparency wherein the toner wetting agent of the second layer is optionally present in an amount of from about 5 parts by weight to about 40 parts by weight and is selected from the group consisting of (1) N,N-bis(2hydroxy propyl) ethanolamine, (2) 3-octadecyloxy-1,2-propanediol, (3) 1-4bis(2-hydroxyethyl) piperazine, (4) 4-8-bis(hydroxymethyl) tricyclo(5.2.1.$0^{2,6}$) decane, (5) 2,4,7,9-tetra methyl-5-decyne-4,7-diol; a transparency wherein the toner wetting agent is the alcohol 4-8-bis(hydroxymethyl) tricyclo (5.2.1.$0^{2,6}$) decane; a transparency wherein the dry thickness of the second coating layer from about 0.5 microns to about 25 microns; a transparency wherein the hydrophilic binder is present in an amount of from about 89 parts by weight to about 25 parts by weight, the acid salt is present in an amount of from about 5 parts by weight to about 40 parts by weight, the cationic component is present in an amount of from about 4 parts by weight to about 25 parts by weight, the luminescent component is present in an amount of from about 1 part by weight to about 5 parts by weight and the biocide compound is present in an amount of from about 1 part by weight to about 5 parts by weight; a transparency wherein the luminescent component is a fluorescent dye or a fluorescent pigment; a transparency wherein the dry thickness of each of the third and fourth hydrophilic coating layers is about 0.5 micron to about 25 microns; a coated transparency wherein the biocide is optionally present in an amount of from about 1 to about 5 parts by weight and is (1) 2-bromo-4'-hydroxyacetophenone; (2) 3,5-dimethyl tetrahydro-2H1,3, 5-thiadiazine-2-thione; (3) potassium N-hydroxy methyl-N-methyldithiocarbamate; (4) sodium dichlorophene; (5) poly (oxyethylene(dimethylamino)-ethylene(dimethylamino) ethylene dichloride; the lightfast UV absorber compound optionally present in an amount of from about 8 parts by weight to about 0.5 part by weight is (1) poly(4-hydroxy-2,2,6,6-tetramethyl-1-piperidine ethanol/dimethylsuccinic acid); (2) 2-hydroxy-4-(octyloxy) benzo phenone; (3) poly (2-(4-benzoyl-3hydroxy phenoxy)ethylacrylate; (4) poly(N, N-bis(2,2,6,6-tetramethyl-4piperidinyl)-1,6-hexane diamine-co-2,4-dichloro-6-morpholino- 1,3,5-triazine); (5) 1-(N-(poly(3-allyloxy-2-hydroxypropyl)-2-aminoethyl)-2-imidazolidinone; the lightfast antioxidant compound optionally present in an amount of from about 4 parts by weight to about 0.25 part by weight is (1) didodecyl-3, 3'thiodipropionate, (2) ditridecyl-3,3'-thiodipropionate, (3) dicetyl-3,3'thiodipropionate, (4) 2,6-di-tert-butyl-p-cresol, (5) 2,6-di-tert-butyl-a-dimethyl amino-p-cresol; the lightfast antiozonant compound optionally present in an amount of from about 4 parts by weight to about 0.25 part by weight is (1) Nisopropyl-N'-phenyl-phenylene diamine; (2) N-(1,3-dimethylbutyl)-N'-phenylphenylene diamine; (3) N,N'-bis (1,4-dimethyl pentyl)-p-phenylene diamine, or (4) N,N'-di (2-octyl)-p-phenylenediamine; a method of preparing a transparency comprised of a substrate with two coating layers on the front side and two coating layers on the reverse side of the substrate; wherein said two front side coatings are comprised of a first layer in contact with the substrate, and a second toner receiving coating situated on top of the first coating and wherein the said two coatings in contact with the reverse side of the substrate are comprised of a third coating in contact with the substrate, and a fourth toner receiving coating layer on top of the third coating said method comprising (a) dissolving a coating solution of the first layer in a mixture of about two solvents where at least one solvent is a solvent for the coating layer and at least one other solvent is a gelling agent for the coating layer, (b) dissolving a second toner receiving composition in water, (c) coating the two solutions simultaneously, (d) drying, and (e) coating the third and fourth layers, and drying; a method wherein the solvent is selected in an optional amount of from about 25 percent by weight to about 75 percent by weight and is selected from the group consisting of (1) water, (2) pyridine, (3) formyl morpholine, (4) 2-(2-piperidin oethyl) pyridine and mixtures thereof; and wherein the swelling and gelling solvent is selected in an optional amount of from about 75 percent by weight to about 25 percent by weight and is selected from the group consisting of (1) methanol, (2) hexanol, (3) decanol, (4) butylene glycol, (5) 1,2-pentane diol, and (6) 1,5hexane diol; a transparency wherein the dry thickness of the first and second layer combined is between about 1 micron to about 30 microns, and wherein the dry thickness of the third and fourth layer combined is about 1 micron to about 30 microns; a coated transparency comprised of a substrate with at least about four layers, at least about two layers on one surface substrate and at least about two layers on the second surface substrate, wherein said layers are comprised of a coating layer in contact with the substrate comprised of a blend of (1) a binder, (2) a water soluble acid salt, (3) a cationic component, and (4) a biocide, and the second layer situated on top of the first coating is comprised of (1) a latex binder, (2) a toner wetting agent, (3) a lightfast UV absorber, (4) an optional lightfast antioxidant, and (5) an optional lightfastness compound; and wherein said two coatings in contact with the second, or reverse side of the substrate are comprised of a third layer comprised of a blend of (1) a hydrophilic binder, (2) a water soluble acid salt, (3) a cationic component, (4) a luminescent component, and (5) a biocide, and the fourth coating situated on top of the third coating is comprised of (1) a latex binder, (2) a toner wetting agent, and (3) a lightfastness compound; and a transparency wherein the lightfastness compound is comprised of a mixture of said UV absorber, a lightfast antioxidant compound, and a lightfast antiozonant compound, and said coatings are hydrophylic; and wherein the first hydrophilic layer is comprised of (A) a porous hydrophilic polymer such as hydroxy propyl hydroxy ethyl cellulose, Aqualon Company; (B) water soluble fillers such as acid salts such as (R)-(−)-3-pyrrolidinol hydrochloride, Aldrich #43,072-2; 2,5-dimethoxy-4-morpholinoaniline dihydrochloride, Aldrich #43,936-3; (C) a cationic compound such as (1) tetramethyl ammonium bromide (Aldrich #19,575-8), (2) tetra methyl ammonium chloride (Aldrich #T1,952-6), (3) tetramethyl ammonium iodide (Aldrich #23,594-6); or (4) polymethyl acrylate trimethyl ammonium chloride, such as HX42-1, and (D) a biocide such as cationic poly(oxyethylene (dimethylamino)-ethylene (dimethylamino) ethylene dichloride) (Busan 77, Buckman Laboratories Inc.); and wherein the hydrophilic first coating layer composition blend is preferably dissolved in a mixture of at least two solvents where one of the solvents such as water is a solvent for the hydrophilic polymeric binder and the second solvent such as methanol, ethanol, propanol or related alcohols, acetone, ethyl acetate or mixtures thereof, are swelling/gelling agents (a component in which the polymer has limited solubility, for example about 0.25 to about 0.50 percent per 100 milliliters of solvent) for the hydrophilic polymeric binder. The proportion of the first solvent in the mixture of solvents varies from about 25 to about 75 percent by weight and the proportion of the gelling solvent varies for example, from about 75 to about 25 percent by weight (about, between, includes throughout at least all in between with the numbers recited).

The second hydrophilic ink/toner receiving layer can comprise (A) a polymeric binder such as polyester latex Eastman AQ-29D, about 37 parts of a sulfonated polyester about 63 parts water; (B) a toner wetting agent such as 4-8-bis(hydroxymethyl) tricyclo(5.2.1.02.6)decane, (Aldrich #B4,590-9); 1-(N,N-bis(2-hydroxyethyl) isopropanol amine, (Aldrich #23,375-7); N,N-bis(2-hydroxypropyl) ethanolamine, (Karl Industries); 1-(2-(2-hydroxy ethoxy)ethyl)-piperazine, (Aldrich #33,126-0); 1-4-bis(2-hydroxyethyl) piperazine, (Aldrich #B4, 540-2), (C)a lightfast UV agent such as poly(4hydroxy-2,2,6,6-tetramethyl-1-piperidine ethanol/ dimethyl succinic acid), Ciba-Geigy Corporation, poly(3,5-di-tert-butyl-4-hydroxyhydrocinnamic acid ester/1,3,5-tris(2-hydroxy ethyl)-5-triazine-2,4,6(1H,3H,5H)-trione, Goodrich Chemicals, (D) lightfast antioxidants such as didodecyl-3,3'-thio dipropionate, Cyanox-LTDP, #D12,840-6; ditridecyl-3,3'-thiodipropionate, #41,311-9; (E) lightfast antiozonant compounds such as N-(1,3dimethylbutyl)-N'-phenyl-phenylene diamine, Monsanto Chemicals; N,N'di(2-octyl)-p-phenylene diamine, Vanderbilt Corporation; N,N'-bis(1,4dimethyl pentyl)-p-phenylene diamine, 77, Monsanto Chemicals and which blend can be dispersed in a single solvent such as water. These two front coatings can be applied simultaneously using a two slot die and preferably dried at about 125° C. The coating thickness of the two combined dried coatings on the front side is about 1 to about 30 microns whereas the individual thickness of each coating varies between about 0.5 to about 25 microns. Reversing the front coatings on an empty roll, the back side of the coated substrate is further coated with the same two coatings as on the front side with the primary exception that the third coating includes, for example, from about 0.5 to about 5 parts of a luminescent material like Diazo fast yellow fluorescent dye and pigments, such as those dispersed in polyester or triazine-aldehyde-amide available from Radiant Color Corp. including Radiant R-105-Series; including R-105-810 chartreuse; R-105-811 green; R-105-812 orange-yellow; R-105-813 orange; R-105-814 orange-red; R-105-815 red; R-105-816 cerise; R-105-817 pink; R-103-G-118 magenta; R-103-G-119 blue. These two back coatings are preferably dried at about 150° C. to remove any excess trapped moisture remaining in the front coatings. The coating thickness of the two combined dried coatings on the back side is between 1 to 30 microns whereas the individual thickness of each coating varies between about 0.5 to about 25 microns. The about equiamounts of materials on the front and the back side of the substrate can prevent or minimize curling of the transparencies during their printing 5 applications. It is possible to use a different material package on the backside to suit a multitude of printers and copiers which employ different inks/toners. The haze values of these transparencies, for example, is between about 3 to about 8 in embodiments.

The transparencies of the present invention comprise a substrate or base sheet having two coatings on both lateral surfaces thereof. Any suitable substrate can be employed, examples of which include polyesters, including MYLAR®, a polyethylene terephthalate E.I. Du Pont de Nemours and Company, Melinex®, polyethylene terephthalate Imperial Chemicals, Inc., CELANAR®, polyethylene terephthalate Celanese Corporation, polyethylene naphthalates, such as Kaladex PEN films, Imperial Chemical Industries, polycarbonates, such as LEXAN®, General Electric Company, polysulfones, such as those Union Carbide Corporation, polyether sulfones, such UDEL®, Union Carbide Corporation, cellulose triacetate, polyvinylchloride cellophane, polyvinyl fluoride, polyimides, and the like, with polyester, such as MYLAR®, being preferred primarily because of its availability and relatively low cost. The substrate can also be opaque, including opaque plastics, such as TESLIN® PPG Industries, and filled polymers, ICI, with fillers such as oxides and sulfates.

The substrate, which preferably includes coatings thereon, and thereunder in contact with the substrate, can be of any effective thickness. Typical thicknesses for the substrate are from about 50 to about 500 microns, and preferably from about 100 to about 125 microns, although the thickness may be outside these ranges.

The first coating composition situated on the front of the substrate, and comprised of a binder polymer, a water soluble filler, an cationic agent, and a biocide, typically posses a total thickness of for example from about 0.5 to about 25 microns and preferably from about 5 to about 10 microns, although the thickness can be outside of these ranges. In the first coating composition the binder components can be present within the coating in any effective amount; typically the binder is present in amounts of from about 97.9 parts by weight to about 20 parts by weight and preferably from about 90 parts by weight to about 30 parts by weight, although the amounts can be outside of this range. The water soluble fillers of the first coating include acid salts that are present in amounts of for example from about 1 part by weight to about 50 parts by weight and preferably from about 5 parts by weight to about 45 parts by weight, although the amounts can be outside of this range. The cationic components are present in the first coating composition in amounts of for example from about 1 part by weight to about 25 parts by weight and preferably from about 4 parts by weight to about 20 parts by weight, although the amounts can be outside of this range. The biocides of the first layer coating composition are present in amounts of fro example from about 0.1 part by weight to about 5 parts by weight and preferably from about 1 part by weight to about 5 parts by weight, although the amounts can be outside of this range.

The aforementioned amounts can be determined, for example, as follows:

Various blends of the binders, the water soluble fillers, cationic components, and biocides are generated in water and ethanol mixtures and coated on to various substrates such as polyester MYLAR® using Meyer rods to yield transparencies with first layers thereover. These transparencies are further coated with a second ink/toner receiving layer comprised of a binder, a toner wetting agent, a lightfast UV compound, and a lightfast antioxidant compound, and a lightfast antiozonant compound preferably from a water based emulsion. After drying the transparencies for example at 125° C., they were tested for coating adhesion between the first and second layer, printed with a Xerox Corporation 5760™ color copier as well as Xerox XJ4C™ ink jet color printer on the second ink/toner receiving layer, for example, to check print quality, gloss values, lightfast values and curl. The data of coating adhesion between the first and second layer, print quality, gloss values, lightfast values of images on the ink/toner receiving layer obtained as a function of the coating composition was analyzed statistically for optimum range of compositions.

A preferred composition range for the hydrophilic first layer of the transparency is the binder present in amounts of from about 90 parts by weight to about 30 parts by weight, the water soluble filler present in an amount of from about 5 parts by weight to about 40 parts by weight, the cationic compound present in an amount of from about 4 parts by weight to about 25 parts by weight, and the biocide compound present in amounts of from about 1 part by weight to about 5 parts by weight. The first layer composition comprised of (1) a binder, (2) a water soluble filler, (3) cationic components, (4) a biocide, has the following preferred composition range based on total of 100 parts (90+5+4+1=100) to (30+40+25+5=100).

A preferred composition range for the second layer of the transparency is the binder present in amounts of from about 76 parts by weight to about 54 parts by weight, the toner wetting agent present in an amount of from about 8 parts by weight to about 40 parts by weight, the lightfast UV absorber compound present in an amount of from about 8 parts by weight to about 0.5 part by weight, the lightfast antioxidant compound present in an amount of from about 4 parts by weight to about 0.25 part by weight, the lightfast antiozonant compound present in an amount of from about 4 parts by weight to about 0.25 part by weight . This second layer composition comprised of (1) binder, (2) a ink/toner wetting agent, (3) lightfast UV absorber, (4) lightfast antioxidant compound, (5) lightfast antiozonant compound has the following preferred composition range based on total of 100 parts (76+8+8+4+4=100) to (54+45+0.5+0.25+0.25=100).

Examples of the first hydrophilic layer situated in contact with the substrate include water soluble polymers present in amounts of from about 97.9 parts by weight to about 20 parts by weight and preferably from about 90 parts by weight to about 30 parts by weight, such as (1) hydroxypropyl methyl cellulose, (Methocel K35LV, Dow Chemicals), (2) hydroxypropyl hydroxy ethyl cellulose, Aqualon Company, (3) diethylammonium chloride hydroxy ethyl cellulose, Celquat H-100, L-200, National Starch and Chemical Company), (4) hydroxypropyl trimethyl ammonium chloride hydroxyethyl cellulose, Polymer JR, Union Carbide Company, (5) poly (2-acrylamide-2-methyl propane sulfonic acid) (#175), (6) poly(N,N-dimethyl-3,5-dimethylene piperidinium chloride) (#401); Scientific Polymer Products. Hydroxypropyl hydroxy ethyl cellulose, Aqualon Company; diethylammonium chloride hydroxy ethyl cellulose, Celquat H-100, L-200, National Starch and Chemical Company), are preferred.

Water soluble fillers of the first layer present in amounts of for example, from about 1 part by weight to about 50 parts by weight and preferably from about 5 parts by weight to about 45 parts by weight, include (1) (R)-(−)-3-pyrrolidinol hydrochloride, Aldrich #43,072-2; (2) 2,5-dimethoxy-4-morpholinoaniline dihydrochloride, Aldrich #43,936-3; (3) 4-bromo piperidine hydrobromide, Aldrich #42,232-0; (4) 3-amino-1H-isoindole hydrochloride, Aldrich #41,592-8; (5) 2-amino-4'-methoxy acetophenone hydrochloride, Aldrich #41,594-4; (6) (S)-(+)-2-amino-3-cyclohexyl-1propanol hydrochloride, Aldrich #43,226-1; (7) 2-amino-4'-bromoaceto phenone hydrochloride, Aldrich #41,534-0; and (8) 2,3-diamino propionic acid monohydrochloride (R)-(−)-3-pyrrolidinol hydrochloride, Aldrich #43,0722; with (2) 2,5-dimethoxy-4-morpholinoaniline dihydrochloride, Aldrich #43,936-3; being preferred.

The cationic components of the first coating layer composition present in amounts of from about 1 part by weight to about 25 parts by weight and preferably from about 4 parts by weight to about 20 parts by weight are selected from monoammonium salts as disclosed in, for example, U.S. Pat. No. 5,320,902, the disclosure of which is totally incorporated herein by reference, including tetradecyl ammonium bromide (Fluka 87582), tetradodecyl ammonium bromide (Fluka 87249), tetrahexadecyl ammonium bromide (Fluka 87298), tetraoctadecyl ammonium bromide (Aldrich #35, 8738), and the like; tallow dimethyl trimethyl propylene diammonium chloride (Tomah Q-D-T from Tomah), N-cetyl, N-ethyl morpholinium ethosulfate (G-263, ICI Americas). Also, suitable cationic antistatic quaternary salts monomeric or polymeric include phosphonium compounds, such as, for example, those disclosed in copending application U.S. Ser. No. 08/034,917, the disclosure of which is totally incorporated herein by reference, including bromomethyl triphenyl phosphonium bromide (Aldrich #26,915-8), (3-hydroxy-2-methyl propyl) triphenyl phosphonium bromide (Aldrich #32,507-4).

Other cationic components include o-xylylene bis (triphenyl) phosphonium bromide, Aldrich #X110-5; heptyl triphenyl phosphonium bromide), Aldrich #37,753-8; dodecyl triphenyl phosphonium bromide), Aldrich #17,262-6; (3-(ethoxycarbonyl)-2-oxypropyl) triphenyl phosphonium chloride, Aldrich #42,424-2; (3-(ethoxy carbonyl)-2-propyl) triphenyl phosphonium bromide, Aldrich #34,985-2; benzyltriphenyl phosphonium bromide, Aldrich #43,005-6; (ethoxy carbonyl methyl) dimethyl sulfonium bromide, Aldrich #14,526-2; tetra octyl phosphonium bromide, Aldrich #44,213-5; tetraethylammonium hexafluoro phosphate, Aldrich #43,411-6; tetra butyl ammonium dihydrogen phosphate, Aldrich #44,710-2; tetra methyl ammonium hydrogen phthalate, Aldrich #43,832-4; 1-propyl pyridinium bromide, Aldrich #41,288-0; 2-propyl isoquinolinium bromide, Aldrich #41,287-2; 1-phenacyl pyridinium bromide, Aldrich #15,142-4; 1,3-didecyl-2methyl imidazoliniumchloride, Aldrich #43,378-0; bis(tetramethyl ammonium)carbonate, Aldrich #43,838-3; bis(tetrabutyl ammonium) sulfate, Aldrich #43,830-8; (2-acryloyloxyethyl) (benzoylbenzyl) dimethyl ammoniumbromide, Aldrich #40,632-5; and (2-acryloyloxyethyl) trimethyl ammonium methyl sulfate, Aldrich #40,811-5.

Examples of biocides for the first hydrophilic layer present in amounts of for example, from about 0.1 part by weight to about 5 parts by weight and preferably from about 1 to about 5 parts by weight include (A) nonionic biocides, such as 2-bromo-4'-hydroxyacetophenone, (Busan 90, Buckman Laboratories); 3,5-dimethyl tetrahydro-2H-1,3,5-thiadiazine-2thione (Slime-Trol RX-28, Betz Paper Chem Inc.); a nonionic blend of 5chloro-2-methyl-4-isothiazoline-3-one, 75 percent by weight, and 2-methyl-4isothiazolin-3-one, 25 percent by weight, (available as Amerstat 250 from Drew Industrial Division; Nalcon 7647, from Nalco Chemical Company; Kathon LX, from Rohm and Haas Company); and the like, as well as mixtures thereof; (B) anionic biocides, such as anionic potassium N-hydroxymethyl-N-methyl-dithiocarbamate (available as Busan 40 from Buckman Laboratories Inc.); an anionic blend of methylene bis-thiocyanate, 34 percent by weight, sodium dimethyl-dithiocarbamate, 33 percent by weight, and sodium ethylene bisdithiocarbamate, 33 percent by weight, (available as Amerstat 282 from Drew Industrial Division; AMA-131 from Vinings Chemical Company); (6) sodium dichlorophene (G-4-40, Givaudan Corporation); and the like, as well as mixtures thereof; (C) cationic biocides, such as cationic poly(oxyethylene (dimethylamino)-ethylene (dimethylamino) ethylene dichloride) (Busan 77, Buckman Laboratories Inc.); (3) a cationic blend of bis (trichloromethyl) sulfone and a quaternary ammonium chloride (available as Slime-Trol RX-36 DPB-865 from Betz Paper Chem. Inc.); and the like, and mixtures thereof. The biocide can be present in any effective amount; typically, the biocide is present in an amount of from about 0.1 percent by weight to about 3 percent by weight, although the amount can be outside this range.

The solvents for forming the first hydrophilic layer include:(1) water, (2) lactic acid 85 percent solution in water, (Aldrich #25,247-6), (3) 4-formylmorpholine, (Aldrich #25, 037-6), (4) 2-(2-piperidino ethyl) pyridine, (Aldrich #30, 396-8), (5) N-ethylpyridinium bromide, (Alfa #A17911)/ pyridine(1:1) ratio; and the swelling and gelling solvents of the first hydrophilic layer include (1) alcohols like methanol, (Aldrich #32,241-5), (2) hexanol, (Aldrich #H1,240-4), (3) decanol, (Aldrich #15,058-4), (4) butylene glycol, (Aldrich #B8, 480-7), (5) 1,2-pentane diol, (Aldrich #26,028-2), (6) 1,5-hexane diol, (Aldrich #19,818-8).

The second ink/toner coating composition situated on the top of the first hydrophilic coating is comprised of a (1) binder, (2) an ink/toner wetting agent, (3) a lightfast UV absorber, (4) a lightfast antioxidant compound and (5) a lightfast antiozonant compound. Typically, the total thickness of this coating layer is from about 2 to about 15 microns and preferably from about 5 to 10 microns, although the thickness can be outside of these ranges. In the second coating composition the binder components can be present within the coating in any effective amount; typically the binder is present in amounts of from about 79 parts by weight to about 39 parts by weight and preferably from about 76 parts by weight to about 54 parts by weight, although the amounts can be outside of this range. The ink/toner wetting agent is present in an amount from about 1 parts by weight to about 60 parts by weight and preferably of from about 8 parts by weight to about 45 parts by weight, although the amounts can be outside of this range. The lightfast UV absorber compound is present in an amount of from about 10 parts by weight to about 0.5 parts by weight and preferably from about 8 parts by weight to about 0.5 parts by weight, although the amounts can be outside of this range. The lightfast antioxidant compound is present in an amount of from about 5 parts by weight to about 0.25 part by weight and preferably from about 4 parts by weight to about 0.25 part by weight, although the amounts can be outside of this range. The lightfast antiozonant compound is present in an amount of from about 5 parts by weight to about 0.25 part by weight and preferably from about 4 parts by weight to about 0.25 part by weight, although the amounts can be outside of this range.

Examples of suitable binders of the second ink/toner receiving layer include water polymeric emulsions/ latexes comprised of functionalized polymers emulsified in water such as (1) sodiosulfo substituted anionic polyester latex Eastman AQ-29D prepared via condensation of an aromatic dicarboxylic acid with an aliphatic alcohol obtained from Eastman Chemical Company; (2) carboxylated styrene-butadiene latexes, RES 4040 and RES 4100, Unocal Chemical; (3) styrene-butylacrylate copolymer emulsions and their modifications with waxes as described in U.S. Pat. No. 5,482,812 (Hopper et. al.), the disclosure of which is totally incorporated herein by reference, and (4) carboxylated butadiene-styrene-2-vinyl pyridine terpolymer latex, Pyratex J 1904, Bayer AG, Germany. These latexes have high solids contents ranging between about 35 grams dry polymer and about 65 grams water to about 55 grams dry polymer and about 45 grams water. In the Examples, 75 parts by weight of the latex polymer refers to the dry polymer of the latex and not water. Styrene-butylacrylate copolymer emulsions and their modifications with waxes as described in U.S. Pat. No. 5,482,812 and butadiene-styrene-2-vinyl pyridine terpolymer latex, Pyratex J 1904, Bayer AG, Germany are preferred.

The ink/toner wetting agents of the second layer present in amounts of, for example, from about 1 to about 50 parts by weight and preferably from about 8 to about 40 parts by weight include (A) amino alcohols such as (1) N-methyl diethanol amine, (Aldrich #M4,220-3), (2) N-ethyl diethanol amine, (Aldrich #11,206-2), (3) N-butyl diethanolamine, (Aldrich #12,425-7), (4) N-phenyl diethanolamine, (Aldrich #P2,240-0), (5) triethanol amine, (Aldrich #T5,830-0), (6) 3-(diethylamino)-1,2-propanediol, (Aldrich #21,022-6), (7) N,N-bis(2-hydroxy propyl)ethanolamine, (Karl Industries), (8) 3-amino-1,2-propanediol, (Aldrich #A7,600-1), (9) 3-(diisopropylamino)-1,2-propanediol, (Aldrich #25,766-4), (10) 3-(N-benzyl-N-methylamino)-1,2-propanediol, (Aldrich #21,850-2), (11) 3-pyrrolidino-1,2-propanediol, (Aldrich #21,8516-0), (12) 3-piperidino-1,2-propanediol, (Aldrich #21,849-9), (13) 3-morpholino-1,2-propane diol, (Aldrich #21,848-0), (14) 1-(N,N-bis(2-hydroxy ethyl) isopropanol amine, (Aldrich #23,375-7); with N,N-bis (2-hydroxypropyl)ethanolamine, (Karl Industries), being preferred;

(B) alkoxy alcohols such as (1) 1,4-bis(2-hydroxyethoxy)-2-butyne, (Aldrich #B4,470-8); (2) 3-methoxy-1,2-propanediol, (Aldrich #26,040-1); (3) 3-allyloxy-1,2-propanediol, (Aldrich #25,173-9), (4) 3-ethoxy-1,2-propanediol, (Aldrich #26,042-8), (5) 3-phenoxy-1,2-propanediol, (Aldrich #25,781-8), (6) 3-octadecyloxy-1,2-propanediol, (Aldrich #B40-28), (7) 2-benzyloxy-1,3-propanediol, (Aldrich 36,744-3), (8) 1-(2-(2-hydroxy ethoxy) ethyl)-piperazine (Aldrich 33,126-0), (9) 1-4-bis(2-hydroxyethyl) piperazine, (Aldrich #B4,540-2), with 3-octadecyloxy-1,2-propanediol, (Aldrich #B40-28) being preferred; and (C) alkyl alcohols such as (1)1-phenyl-1,2-ethanediol, (Aldrich #30,215-5; P2 405-5), (2) 2.2-dimethyl-1-phenyl-1,3-propanediol, (Aldrich #40,873-5), (3) 2-(hydroxymethyl)-1,3-propanediol, (Aldrich #39,365-7), (4) 2-ethyl-2(hydroxymethyl)-1,3-propanediol, (Aldrich #14,808-3), (5) 2-butyl-2-ethyl-1,3-propanediol, (Aldrich #14,247-6), (6) 2,2,4-trimethyl-1,3-pentane diol, (Aldrich #32,722-0), (7) 4-8-bis(hydroxymethyl) tricyclo (5.2.1.$0^{26}$) decane, (Aldrich #B4,590-9); (8) 3,6-dimethyl-4-octyne-3, 6-diol, (Aldrich #27,840-8); (9) 2,4,7,9-tetra methyl-5-decyne-4,7-diol; (10) pantothenol, (Aldrich 29,578-7), with 4-8-bis(hydroxymethyl) tricyclo (5.2.1.$0^{2,6}$) decane, (Aldrich # B4,590-9) being preferred.

The ink/toner receiving second and fourth outer layers of the transparencies of the present invention preferably contain lightfast compounds as disclosed, for example, in U.S. Pat. No. 5,624,743, the disclosure of which is totally incorporated herein by reference. The ink/toner receiving layer may contain a lightfast agent only like UV absorbing compounds such as (1) poly(4-hydroxy-2,2,6,6-tetramethyl-1-piperidine ethanol/dimethyl succinic acid), Ciba-Geigy Corporation, (2) 2-hydroxy-4-(octyloxy) benzophenone, Cyasorb-UV-531, #41,315-1, (3) poly(2-(4benzoyl-3-hydroxy phenoxy) ethylacrylate) (Cyasorb-UV-2126, #41, 323-2, (4) poly(N,N-bis(2,2,6,6-tetramethyl-4-piperidinyl)-1,6-hexane diamine-co-2,4-dichloro-6-morpholino-1,3,5-triazine), Cyasorb-UV-3346, #41,324-0, (5) 1-(N-(poly(3-allyloxy-2-hydroxypropyl)-2-amino ethyl)-2-imidazolidinone, #41,026-8, Aldrich Chemical Company. Also, the ink/toner receiving layer of the transparencies of the present invention can contain only a lightfast antioxidant compound such as (1) didodecyl-3,3'-thiodipropionate, Cyanox, LTDP, #D12,840-6, (2) ditridecyl-3,3'-thiodipropionate, Cyanox-711, #41,311-9, Aldrich Chemical Company, (3) dicetyl-3,3'-thiodipropionate, Evans-Chemetics-Corporation, (4) 2,6-di-tert-butyl-p-cresol, Vulkanox-KB, Mobay Chemicals, and (5) 2,6-di-tert-butyl-a-dimethyl amino-p-cresol, Ethanox 703, Ethyl Corporation. Moreover, the ink/toner receiving layers of the transparencies can preferably contain a lightfast antiozonant (1) N-isopropyl-N'-phenyl-phenylene diamine, Santoflex-IP, (2) N-(1,3-dimethylbutyl)-N'-phenyl-phenylene diamine, Santoflex-13, (3) N,N'-bis(1,4dimethyl pentyl)-p-phenylene diamine, Santoflex-77, Monsanto Chemicals, and (4) N,N'-di(2-octyl)-p-phenylene diamine, Antozite-1, Vanderbilt Corporation.

The ink/toner receiving layer of the transparencies of the present invention preferably contain lightfast compounds, or components comprised of three compounds such as a UV absorbing compound, an antioxidant compound and an antiozonant compound. The lightfast UV absorber compound is present in an amount of for example, from about 10 parts by weight to about 0.5 part by weight and preferably from about 8 parts by weight to about 0.5 part by weight, although the amounts can be outside of this range. The lightfast antioxidant compound is present in an amount of for example, from about 5 parts by weight to about 0.25 part by weight and preferably from about 4 parts by weight to about 0.25 part by weight, although the amounts can be outside of this range. The lightfast antiozonant compound is present in an amount of for example, from about 5 parts by weight to about 0.25 part by weight and preferably from about 4 parts by weight to about 0.25 part by weight, although the amounts can be outside of this range.

Five preferred lightfast compounds selected are (1) UV absorber poly(4-hydroxy-2,2,6,6-tetramethyl-1-piperidine ethanol/dimethyl succinic acid), Ciba-Geigy Corporation; (2) UV absorber poly(2-(4-benzoyl-3-hydroxy phenoxy) ethylacrylate) (Cyasorb-UV-2126, #41,323-2; UV absorber; (3) UV absorber poly(N,N-bis(2,2,6,6-tetramethyl-4-piperidinyl)-1,6-hexane diamine-co-2,4-dichloro-6-morpholino-1,3,5-triazine), Cyasorb-UV-3346, #41,324-0; (4) antioxidant didodecyl 3,3'-thiodipropionate, Cyanox, LTDP, #D12,840-6, Aldrich Chemical Company; and (5) the lightfast antiozonant compound N-(1,3-dimethyl butyl)-N'-phenyl-phenylene diamine.

The third hydrophilic coating on the back side of transparency is comprised of (A) a hydrophilic cellulosic binder such as hydroxypropyl ethylcellulose, Aqualon Company; (B) water soluble fillers such as 2,3diamino propionic acid mono hydrochloride, (Aldrich #21,963-0); (C) a cationic component such as polymethyl acrylate trimethyl ammonium chloride, HX42-1, Interpolymer Corporation, (D) a fluorescent material, or compound, and (E) a biocide such as cationic poly(oxyethylene(dimethylamino)-ethylene (dimethylamino)ethylene dichloride) (Busan77, Buckman Labs Inc).

The binder polymer, water soluble fillers, cationic components and the biocides of the third layer may be selected from the group of materials used for the first layer. Fluorescent brightners derived from fluorescent dyes, such as polymeric dyes such as polymeric phthalocyanines, and the like may be selected for use in the third coating. Fluorescent components that can be selected also include commercially sold colorants dispersed in polymers such as polyamide or triazine-aldehyde-amide are available from Day-Glo Color Corporation such as Day-Glo-A-Series including A-17-N saturn yellow; A-18-N signal yellow; A-16-N arc yellow; A-15-N blaze orange; A-14-N fire orange; A-13-N rocket red; A-12 neon red; A-11 aurora pink; A-21 corona magenta; A-19 horizon blue; the Day-Glo-D-Series; Day-Glo-T-Series; Day-G lo-AX-Series; Day-Glo-SB-Series; Day-Glo-HM-Series; Day-Glo-HMS-Series; dispersions in polyester or triazine-aldehyde-amide available from Radiant Color Corporation including Radiant R-105-Series; R-105-810 chartreuse; R-105-811 green; R-105-812 orange - yellow; R-105-813 orange; R-105-814 orange - red; R-105-815 red; R-105-816 cerise; R-105-817 pink; R-103-G-118 magenta; R-103-G-119 blue; also included are materials from the R-203-G-series; R-P-1600-series; R-P-1700-series; R-XRB-series; R-K-500 series; and visiprint series; those dispersed in triazine-aldehyde-amide are available from Lawter Chemicals including Lawter-B-Series including B-3539 lemon yellow; B-3545 green; B-3515 gold yellow; B-3514 yellow orange; B-3513 red orange; B-3534 red; B-3530 cerise red; B-3522 pink; B-3554 magenta; B-3556 vivid blue; also included are materials from the Lawter-G-3000-Series; Lawter-HVT-Series. Inorganic powder phosphors, polymer dispersed organic pigment phosphors and monomeric or polymeric dye based phosphors and soluble in an alcohol like ethanol and water are preferred primarily because these are less toxic.

Typically, the total thickness of the third coating layer present on the back of the substrate is from about 0.5 to about 25 microns and preferably from about 1 to 10 microns, although the thickness can be outside of these ranges. This third coating composition situated on the back of the substrate, comprises a binder polymer, a water soluble filler, a cationic component, a fluorescent material and a biocide. In the third coating composition the binder components can be present within the coating in any effective amount; typically the binder is present in amounts of from about 25 97.8 parts by weight to about 15 parts by weight and preferably from about 89 parts by weight to about 25 parts by weight, although the amounts can be outside of this range. The water soluble fillers of the third coating include acid salts which are present in amounts of from about 1 part by weight to about 50 parts by weight and preferably from about 5 parts by weight to about 45 parts by weight, although the amounts can be outside of this range. The cationic components are present in the third coating composition in amounts of from about 1 part by weight to about 25 parts by weight and preferably from about 4 parts by weight to about 20 parts by weight, although the amounts can be outside of this range. The fluorescent materials are present in amounts of from about 0.1 part by weight to about 5 parts by weight and preferably from about 1 part by weight to about 5 parts by weight, although the amounts can be outside of this range. The biocides of the third layer coating composition are present in amounts of from about 0.1 part by weight to about 5 parts by weight and preferably from about 1 part by weight to about 5 parts by weight, although the amounts can be outside of this range.

The fourth ink/toner receiving layer preferably is comprised of (1) binder, (2) a toner wetting agent, (3) a lightfast UV absorber, (4) lightfast antioxidant compound, and (5) a lightfast antiozonant compound. Typically, the total thickness of this coating layer is from about 0.1 to about 25 microns and preferably from about 0.5 to 10 microns, although the thickness can be outside of these ranges. In the fourth coating composition the binder components can be present within the coating in any effective amount; typically the binder is present in amounts of from about 79 parts by weight to about 39 parts by weight and preferably from about 76 parts by weight to about 54 parts by weight, although the amounts can be outside of this range. The toner wetting agent is present in an amount from about 1 part by weight to about 50 parts by weight and preferably of from about 8 parts by weight to about 40 parts by weight, although the amounts can be outside of this range. The lightfast UV absorber compound is present in an amount of from about 10 parts by weight to about 0.5 parts by weight and preferably from about 8 parts by weight to about 0.5 part by weight, although the amounts can be outside of this range. The lightfast antioxidant compound is present in an amount of from about 5 parts by weight to about 0.25 part by weight and preferably from about 4 parts by weight to about 0.25 part by weight, although the amounts can be outside of this range. The lightfast antiozonant compound is present in an amount of from about 5 parts by weight to about 0.25 part by weight and preferably from about 4 parts by weight to about 0.25 part by weight, although the amounts can be outside of this range.

The coatings of the present invention can be applied to the substrate by any suitable technique. For example, the layer coatings can be applied by a number of known techniques, including melt extrusion, reverse roll coating, solvent extrusion, and dip coating processes. In dip coating, a web of material to be coated is transported below the surface of the coating material (which generally is dissolved in a solvent) by a single roll in such a manner that the exposed site is saturated, followed by the removal of any excess coating by a blade, bar, or squeeze roll; the process is then repeated with the appropriate coating materials for application of the other layered coatings. With reverse roll coating, the premetered coating material (which generally is dissolved in a solvent) is transferred from a steel applicator roll onto the web material to be coated. The metering roll is stationary or is rotating slowly in the direction opposite to that of the applicator roll. In slot extrusion coating, a flat die is used to apply coating material (which generally is dissolved in a solvent) with the die lips in close proximity to the web of material to be coated. Once the desired amount of coating has been applied to the web, the coating is dried, typically at from about 125 to about 150° C. in an air dryer.

The hydrophilic coating layer composition blend is preferably dissolved and coated on to MYLAR® from a mixture of two or more solvents where one of the solvents such as water is a solvent for the hydrophilic polymeric binder and the other solvent such as methanol, ethanol, propanol, acetone, ethyl acetate or mixtures thereof, are swelling/gelling agents for the hydrophilic polymeric binder. The proportion of the solvent in the mixture of solvents varies from about 25 to about 75 percent by weight and the proportion of the gelling solvent or mixtures thereof vary from about 75 to about 25 percent by weight. The wet coating weight of the hydrophilic layer is generally between 20 grams/meter$^2$ to 200 grams/meter$^2$ resulting in a dry thickness of between 6 microns to about 25 microns. The coatings are applied on to the substrate on a Coater such as a Faustel Coater equipped with an air dryer having three drying zones. After the gel composition has been applied on to the transparency on the coater, these coatings are dried between about 125 to about 150° C.

The transparencies of the present invention in embodiments exhibit reduced curl upon being printed with liquid inks/solid toners, particularly in situations wherein the toner image is dried by exposure to block heat/radiant heat/microwave radiation. Generally, the term curl refers to the distance between the base line of the arc formed by the transparency or recording sheet when viewed in cross-section across its width (or shorter dimension, for example, 8.5 inches in an 8.5 by 11 inch sheet, as opposed to length, or longer dimension, for example, 11 inches in an 8.5 by 11 inch sheet) and the midpoint of the arc. To measure curl, a sheet can be held with the thumb and forefinger in the middle of one of the long edges of the sheet (for example, in the middle of one of the 11 inch edges in an 8.5 by 11 inch sheet) and the arc formed by the sheet can be matched against a pre-drawn standard template curve.

Also, the transparencies of the present invention in embodiments exhibit little or no blocking. Blocking refers to the transfer of ink or toner from a printed image from one sheet to another when xerographic transparencies are stacked together. The transparencies of the present invention exhibit substantially no blocking under, for example, environmental conditions of from about 20 to about 80 percent relative humidity and at temperatures of about 80° F.

The optical density measurements recited herein were obtained on a Pacific Spectrograph Color System. The system consists of two major components, an optical sensor and a data terminal. The optical sensor employs a 6 inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters and the entry of tristimulus values, and an alphanumeric keyboard for entry of product standard information.

The lightfast values of the printed images were measured in the Mark V Lightfast Tester obtained from Microscal Company, London, England.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Twenty transparent recording sheets (transparencies) were prepared by the solvent extrusion process (single side each time initially) on a Faustel Coater using a two slot die by providing for each a MYLAR® base sheet (roll form) with a thickness of 100 microns, and coating the front side of the base sheet with two coatings simultaneously wherein (A) the first porous layer designed to primarily absorb the fuser oils and ink vehicles coating in contact with the substrate was comprised of a blend of (1) 70 parts by weight of the hydrophilic binder hydroxypropyl hydroxyethyl cellulose, Aqualon Company; (2) 20 parts by weight of the water soluble acid salt 2,5-dimethoxy-4-morpholinoaniline dihydrochloride, Aldrich #43,936-3; (3) 9.0 parts by weight of the cationic component (3-(ethoxy carbonyl)-2-propyl) triphenyl phosphonium bromide, Aldrich #34,985-2; and (4) 1 part by weight of the cationic biocide poly(oxyethylene (dimethylamino)-ethylene(dimethyl amino) ethylenedichloride) (Busan 77, Buckman Labs Inc), and which blend was present in a concentration of 5 percent by weight in a 50:50 blend of water and methanol; B) the second ink/toner receiving coating layer on the top of the first layer was comprised of (1) 75 parts by weight of butadiene-styrene-2-vinyl pyridine terpolymer latex, Pyratex J 1904, Bayer AG, Germany, (2) 20 parts by weight toner wetting agent 3-octadecyloxy-1,2-propanediol, (Aldrich #B40-2), (3) 3 parts by weight the lightfast UV agent poly(4-hydroxy-2,2,6,6-tetramethyl- 1-piperidine ethanol/ dimethyl succinic acid), Ciba-Geigy Corporation, (4) 1 part by weight of the lightfast antioxidant didodecyl 3,3'-thiodipropionate, Cyanox, LTDP, #D12,840-6, Aldrich Chemical Company, (5) 1 part by weight of the lightfast antiozonant compound N-(1,3-dimethyl butyl)-N'-phenyl-phenylene diamine, Monsanto Chemicals, and the blend was then dispersed and coated on to transparency from 5 percent by weight solution in water. These two front coatings are applied simultaneously using a two slot die and dried at 125° C. Monitoring the difference in weight prior to and subsequent to coating, the dried MYLAR® base sheet rolls contained 0.6 gram of the two hydrophilic layers. The coating thickness of the two combined dried coatings on the front side is 6 microns whereas the individual thickness of first coating is about 4.5 microns whereas the thickness of the second coating is about 1.5.

Reversing the front coatings on an empty roll, the back side of the coated substrate was then further coated with (C) a third luminescent and antistatic coating in contact with the substrate and which third coating was comprised of a blend of (1) 69 parts by weight of the hydrophilic binder hydroxypropyl hydroxyethyl cellulose, Aqualon Company; (2) 20 parts by weight of the water soluble acid salt 2,5-dimethoxy-4-morpholinoaniline dihydrochloride, Aldrich #43,936-3; (3) 9.0 parts by weight of the cationic component (3-(ethoxy carbonyl)-2-propyl)triphenyl phosphonium bromide, Aldrich #34,985-2; (4) 1 part by weight of the luminescent material B-3539 lemon yellow obtained from Lawter Chemicals; and (5) the cationic biocide poly(oxyethylene (dimethylamino)-ethylene (dimethylamino) ethylenedichloride) (Busan 77, Buckman Labs Inc), and which blend was present in a concentration of 5 percent by weight in a 50:50 blend of water and methanol; and (D) a fourth ink/toner receiving coating layer on the top of the third layer comprised of (1) 75 parts by weight of butadiene-styrene-2-vinyl pyridine terpolymer latex, Pyratex J 1904, Bayer AG, Germany (2) 20 parts by weight of the toner wetting agent 3-octadecyloxy-1,2-propanediol, (Aldrich #B40-2),(3) 3 parts by weight of the lightfast UV agent poly(4-hydroxy-2,2,6,6-tetramethyl- 1-piperidine ethanol/ dimethyl succinic acid), Ciba-Geigy Corporation, (4) 1 part by weight of the lightfast antioxidant didodecyl 3,3'-thiodipropionate, Cyanox, LTDP, #D12,840-6, Aldrich Chemical Company, (5) 1 part by weight of the lightfast antiozonant compound N-(1,3-dimethyl butyl)-N'-phenyl-phenylene diamine, Monsanto Chemicals, and where the blend was dispersed and coated on to transparency from 5 percent by weight solution in water. These back coatings were applied simultaneously with a two slot die but are dried at 150° C. to remove any excess trapped moisture remaining in the front coatings. The coating thickness of the two combined dried coatings on the back side is about 6 microns whereas the individual thickness of first coating is about 4.5 microns and the thickness of the second coating is about 1.5. The two side coated transparency had no curl and the haze value of the transparency was 7.

These coated transparencies were utilized in a Xerox 5760 MajestiK™ Digital Color Copier transporting polyester resin based toners comprised primarily of (1) 70 percent by weight of a polyester derived from the reaction product of terephthalic acid and bisphenol-A-ethylene oxide adduct with cyclohexane dimethanol and obtained from Dainippon Ink and Chemicals Company and (2) 30 percent by weight of a flushed colorant such as cyan (C.I. Pigment Blue), magenta (C.I. Pigment Red), yellow (C.I. Pigment Yellow), all three being available from Danichiseika Color and Chemicals Manufacturing Company, Limited, and black (Carbon Black like Regal 330®) available from Mitsubishi Kasei Corporation and images were obtained on the ink/ toner receiving side of the transparency. These images had gloss values of 85, as measured with a BYK Gardner micro-tri-gloss 75° Gloss Meter and optical density values of 1.65 (cyan), 1.40 (magenta), 1.0 (yellow) and 1.75 (black). These images were oil free, were 100 percent waterfast when washed with water for 2 minutes at 50° C. as determined by visual observation (measuring optical density values before and after washing) and 100 percent lightfast. The lightfast values of the xerographic images were measured in the Mark V Lightfast Tester obtained from Microscal Company, London, England. This was accomplished by measuring optical density values before and after exposure for a period of three months without any change in their optical density.

EXAMPLE II

The transparencies of Example I were also printed with a Xerox Corporation ink jet test fixture equipped with a block heater and containing inks of the following compositions to, for example, determine check print quality, drying times of the images, lightfast and waterfast values.

Cyan:

15.75 Percent by weight of sulfolane, 12.0 percent by weight of butyl carbitol, 2.0 percent by weight of ammonium bromide, 13.0 percent by weight acetylethanolamine, 0.015 percent by weight of ammonium hydroxide, 0.05 percent by weight of polyethylene oxide (molecular weight 18,500), obtained from Union Carbide Company, 22.5 percent by weight of Projet Cyan 1 dye solution, obtained from Zeneca Colors, 18.75 percent by weight of Projet blue OAM dye solution, obtained from Zenca Colors and 15.935 percent by weight of deionized water.

Magenta:

15.75 Percent by weight of sulfolane, 12.0 percent by weight of butyl carbitol, 2.0 percent by weight of ammonium bromide, 13.0 percent by weight acetyl ethanolamine, 0.03 percent by weight of ammonium hydroxide, 0.05 percent by weight of DOWICIL 150 biocide, obtained from Dow Chemical Company, Midland, Mich., 0.05 percent by weight of polyethylene oxide (molecular weight 18,500), obtained from Union Carbide Company, 25 percent by weight of Projet Magenta 1T dye solution, obtained from Zeneca Colors, 6.0 percent by weight of Acid Red 52 solution obtained from Tricon Colors, and 26.12 percent by weight of deionized water.

Yellow:

15.75 Percent by weight of sulfolane, 12.0 percent by weight of butyl carbitol, 13.0 percent by weight acetylethanolamine, 2.0 percent by weight of ammonium bromide, 0.03 percent by weight of ammonium hydroxide, 0.05 percent by weight of DOWICIL 150 biocide, obtained from Dow Chemical Company, Midland, Mich., 0.05 percent by weight of polyethylene oxide (molecular weight 18,500), obtained from Union Carbide Company, 27.0 percent by weight of Projet Yellow 1G dye (7.5 percent solution), obtained from Zeneca Colors, 20.0 percent by weight of Acid Yellow 17 solution obtained from Tricon Colors, and 10.12 percent by weight of deionized water.

Black:

20.0 Percent by weight of sulfolane (Aldrich T2,220-9), 5.0 percent by weight of pantothenol, (Aldrich 29,578-7), 5.0 percent by weight of 1,4-bis(2-hydroxyethoxy)-2-butyne (Aldrich B4,470-8), 5.0 percent by weight of 2,2'-sulfonyldiethanol (Aldrich 18,008-4), obtained from Aldrich Chemical Company, 0.05 percent by weight of DOWICIL 150 biocide, obtained from Dow Chemical Company, Midland, Mich., 0.05 percent by weight of polyethylene oxide (molecular weight 18,500), obtained from Union Carbide Company, 7.0 percent by weight Carbon Black Levanyl A-SF (25.0 milliliters of predispersed Carbon Black Levanyl A-SF dispersion containing 28.0 percent solids of Carbon Black and 6.0 percent dispersant), obtained from Bayer A.G of Germany and 39.90 percent by weight of deionized water.

Images with 100 percent ink coverage were generated on ten transparencies of Example I by printing block patterns for magenta, cyan, yellow, and black. Five of these transparencies were dried without heat and the other five with the dryer on (dryer temperature of between 120 to 150° C., transparent recording sheet temperature of about 50 to 60° C.). The drying times of the resulting images were measured to be 1 minute (yellow), 3 minutes (cyan), 2.5 minutes (magenta), 5 minutes (black), in the absence of heat and 0.5 minute (yellow), 1.5 minutes (cyan),1.5 minutes (magenta), 1.5 minutes (black), in the presence of heat. The resulting images yielded optical density values of 2.05 black, 1.80 cyan, 1.75 magenta and 1.0 yellow. These images had lightfast values of greater than 95 percent and, more specifically, about 99 percent average for all colors after a period of six months, and showed no intercolor bleed when retained at 80 percent humidity at 80° F. for a period of seven days.

EXAMPLE III

Twenty transparent recording sheets (transparencies) were prepared by the solvent extrusion process (single side each time initially) on a Faustel Coater using a two slot die by providing for each a MYLAR® base sheet (roll form) with a thickness of 100 microns, and coating the front side of the base sheet with two coatings simultaneously wherein (A) the first coating in contact with the substrate is comprised of a blend of (1) 70 parts by weight of the binder hydroxypropyl trimethyl ammonium chloride hydroxyethyl cellulose, Polymer JR, Union Carbide Company, (2) 20 parts by weight of water soluble acid salt (R)-(−)-3-pyrrolidinol hydrochloride, Aldrich #43,072-2; (3) 9.0 parts by weight of the cationic component N-cetyl, N-ethyl morpholinium ethosulfate (G-263, ICI Americas), (4) 1 part by weight of the cationic biocide poly(oxyethylene(dimethylamino)-ethylene(dimethylamino) ethylenedichloride) (Busan 77, Buckman Labs Inc), and which blend was present in a concentration of 5 percent by weight in a 50:50 blend of water and 1,5-hexane diol, (Aldrich #19,818-8. The second ink/toner receiving coating layer (B) on the top of the first layer was comprised of (1) 75 parts by weight of sodiosulfo substituted anionic polyester latex Eastman AQ-29D prepared via condensation of an aromatic dicarboxylic acid with an aliphatic alcohol obtained from Eastman Chemical Companym, 20 parts by weight of the toner wetting agent N,N-bis(2-hydroxypropyl)ethanolamine, (Karl Industries), 3 parts by weight of the lightfast UV agent poly(4-hydroxy-2,2,6,6-tetramethyl- 1-piperidine ethanol/dimethyl succinic acid), Ciba-Geigy Corporation, 1 part by weight of the lightfast antioxidant didodecyl 3,3'-thiodipropionate, Cyanox, LTDP, #D12,840-6, Aldrich Chemical Company, 1 part by weight lightfast antiozonant compound N-(1,3-dimethyl butyl)-N'-phenyl-phenylene diamine, Monsanto Chemicals, and the resulting blend was dispersed and coated from a 5 percent by weight solution in water. These two front coatings were applied simultaneously using a two slot die and dried at 125° C. Monitoring the difference in weight prior to and subsequent to coating, the dried MYLAR® base sheet rolls contained 0.6 gram of the two hydrophilic layers. The coating thickness of the two combined dried coatings on the front side is 6 microns whereas the individual thickness of first coating is about 4.5 microns, and the thickness of the second coating is about 1.5.

Reversing the above with the two front coatings on an empty roll, the back side of the coated substrate is further coated with (C) a third coating comprised of a blend of (1) 69 parts by weight of the binder hydroxypropyl trimethyl ammonium chloride hydroxyethyl cellulose, Polymer JR, Union Carbide Company, (2) 20 parts by weight of the water soluble acid salt (R)-(−)-3-pyrrolidinol hydrochloride, Aldrich #43,072-2; (3) 9.0 parts by weight of the cationic component N-cetyl, N-ethyl morpholinium ethosulfate (G-263, ICI Americas), (4) 1 part by weight of the luminescent material R-105-817 pink obtained from Radiant Color Corporation and (5) 1 part by weight of the biocide cationic poly(oxyethylene(dimethylamino)-ethylene (dimethylamino) ethylenedichloride) (Busan77, Buckman Labs Inc.), and which blend was present in a concentration of 5 percent by weight in a 50:50 blend of water and 1,5-hexane diol, (Aldrich #19,818-8) and the fourth coating, (D) the fourth ink/toner receiving coating layer on the top of the third layer was comprised of (1) 75 parts by weight of sodiosulfo substituted anionic polyester latex Eastman AQ-29D prepared via condensation of an aromatic dicarboxylic acid with an aliphatic alcohol obtained from Eastman Chemical Company, (2) 20 parts by weight of the toner wetting agent N,N-bis(2-hydroxypropyl)ethanolamine, (Karl Industries), (3) 3 parts by weight of the lightfast UV agent poly(4-hydroxy-2,2,6,6-tetramethyl-1-piperidine ethanol/dimethyl succinic acid), Ciba-Geigy Corporation, (4) 1 part by weight of the lightfast antioxidant didodecyl 3,3'-thiodipropionate, Cyanox, LTDP, #D12,840-6, Aldrich Chemical Company, (5) 1 part by weight of the lightfast antiozonant compound N-(1,3-dimethyl butyl)-N'-phenyl-phenylene diamine, Monsanto Chemicals, and the resulting blend was dispersed and coated from 5 percent by weight solution in water. These coatings were dried at 150° C. to remove any excess trapped moisture remaining in the front coatings. The coating thickness of the two combined dried coatings on the back side is about 6 microns whereas the individual thickness of first coating is about 4.5 microns whereas the thickness of the second coating is about 1.5. The two side coated transparency had no curl and the haze value of the transparency was 6.

These coated transparencies were utilized in a Xerox 5760 MajestiK™ Digital Color Copier transporting polyester resin based toners comprised primarily of (1) 70 percent by weight of a polyester derived from the reaction product of terephthalic acid and bisphenol-A-ethylene oxide adduct with cyclohexane dimethanol, and obtained from Dainippon Ink and Chemicals company; and (2) 30 percent by weight of a flushed colorant such as cyan (C.I. Pigment Blue), magenta (C.I. Pigment Red), yellow (C.I. Pigment Yellow), all three being available from Danichiseika Color and Chemicals Manufacturing Company, Limited, and black (Carbon Black Regal 330®) available from Mitsubishi Kasei Corporation and images were obtained on the ink/toner receiving side of the transparency. These images had gloss values of 85, as measured with a BYK Gardner micro-tri-gloss 75° Gloss Meter and optical density values of 1.65 (cyan), 1.40 (magenta), 1.0 (yellow) and 1.75 (black). These images were substantially oil free, were 100 percent waterfast when washed with water for 2 minutes at 50° C. as determined by visual observation (measuring optical density values before and after washing) and 100 percent lightfast . The lightfast values of the xerographic images were measured in the Mark V Lightfast Tester obtained from Microscal Company, London, England. This was accomplished by measuring optical density values before and after exposure for a period of three months without any change in their optical density.

EXAMPLE IV

The transparencies of Example III were also printed with a Xerox Corporation ink jet test fixture equipped with a block heater and containing the inks of Example II, to check print quality, drying times of the images, lightfast and waterfast values.

Images with 100 percent ink coverage were generated on ten of the transparencies by printing block patterns for magenta, cyan, yellow, and black. Five of these transparencies were dried without heat and the other five with the dryer on (dryer temperature of between 120 to 150° C., transparent recording sheet temperature of about 50 to 60° C. ). The drying times of the resulting images were measured to be 40 seconds (yellow), 2.5 minutes (cyan), 2.25 minutes (magenta), 4 minutes (black), in the absence of heat and 0.5 minute (yellow),1.5 minutes (cyan), 1.5 minutes (magenta), 2.0 minutes (black), in the presence. of heat. The resulting images yielded optical density values of 2.25 black, 1.85 cyan, 1.85 magenta and 1.05 yellow. These images had lightfast values of greater than 95 percent and, more specifically, about 98 percent average for all colors after a period of six months, and showed no intercolor bleed when retained at 80 percent humidity at 80° F. for a period of seven days.

Other embodiments and modifications of the present invention may occur to those skilled in the art subsequent to a review of the information presented herein; these embodiments and modifications, as well as equivalents thereof, are also included within the scope of this invention.

What is claimed is:

1. A transparency comprised of a substrate with two coating layers on the front side of the substrate and two coating layers on the reverse side of the substrate, wherein said front side coatings are comprised of an antistatic hydrophilic layer in contact with the substrate and which layer is comprised of a blend of (1) a hydrophilic binder, (2) a water soluble acid salt, (3) a cationic component, and (4) a biocide, and the second coating situated on top of the first coating is comprised of (1) a binder formed from a latex, (2) a toner wetting agent, (3) a lightfast UV absorber, (4) a lightfast antioxidant, and (5) a lightfast antiozonant compound; and wherein said two coatings in contact with the reverse side of the substrate are comprised of a third hydrophilic antistatic coating comprised of a blend of (1) a hydrophilic binder, (2) a water soluble acid salt, (3) a cationic component (4) a luminescent component and (5) a biocide, and the fourth coating situated on top of the third coating is comprised of (1) a binder formed from a latex, (2) a toner wetting agent, (3) a lightfast UV absorber, (4) a lightfast antioxidant, and (5) a lightfast antiozonant compound.

2. A transparency in accordance with claim 1 wherein the substrate is selected from the group consisting of (1) polyethylene terephthalate, (2) polyethylene naphthalate, (3) polycarbonate, (4)polysulfone, (5) polyether sulfone, (6) poly(arylene sulfone), (7) cellulose triacetate, (8) polyvinyl chloride, (9) cellophane, (10) polyvinyl fluoride, (11) polypropylene, and (12) polyimide.

3. A transparency in accordance with claim 1 wherein in the first hydrophilic coating layer the binder is present in amounts of from about 90 parts by weight to about 30 parts by weight, the water soluble salt is present in an amount of from about 5 parts by weight to about 40 parts by weight, the cationic component present in an amount of from about 4 parts by weight to about 25 parts by weight, and the biocide is present in an amount of from about 1 part by weight to about 5 parts by weight and wherein the total parts of all components is about 100.

4. A transparency in accordance with claim 1 wherein the hydrophilic binder of the first antistatic coating is (1) hydroxypropyl methyl cellulose, (2) hydroxypropyl hydroxyethyl cellulose, (3) diethylammonium chloride hydroxy ethyl cellulose, (4) hydroxypropyl trimethyl ammonium chloride hydroxyethyl cellulose, (5) poly(2-acrylamide-2-methyl propane sulfonic acid), or (6) poly(N,N-dimethyl-3,5-dimethylene piperidinium chloride).

5. A transparency in accordance with claim 1 wherein the hydrophilic binder is hydroxypropyl hydroxyethylcellulose, or diethylammonium chloride hydroxy ethyl cellulose.

6. A transparency in accordance with claim 1 wherein the acid salt of the first layer is selected from the group consisting of (1) (R)-(−)-3-pyrrolidinol hydrochloride, (2) 2,5-dimethoxy-4-morpholinoaniline dihydrochloride, (3) 3-amino-1H-iso indolehydrochloride, (4) (S)-(+)-2-amino-3-cyclohexyl-1-propanol hydrochloride, and (5) 2,3-diamino propionic acid monohydrochloride.

7. A transparency in accordance with claim 6 wherein said acid salt is (1) (R)-(−)-3-pyrrolidinol hydro chloride, (2) 2,5-dimethoxy-4-morpholinoaniline dihydrochloride.

8. A transparency in accordance with claim 1 wherein the dry thickness of the first layer is about 0.5 micron to about 25 microns.

9. A transparency in accordance with claim 1 wherein the binder is present in an amount of from about 76 parts by weight to about 54 parts by weight, the toner wetting agent is present in an amount of from about 8 parts by weight to about 40 parts by weight, the lightfast UV absorber compound is present in an amount of from about 8 parts by weight to about 0.5 part by weight, the lightfast antioxidant is present in an amount of from about 4 parts by weight to about 0.25 part by weight, and the lightfast antiozonant compound is present in an amount of from about 4 parts by weight to about 0.25 parts by weight.

10. A transparency in accordance with claim 1 wherein the binder is selected from the group consisting of (1) sodiosulfo substituted anionic polyester latex (2) styrene-butadiene latexes, (3) styrene-butylacrylate copolymer and (4) butadiene-styrene-2-vinyl pyridine terpolymer latex.

11. A coated transparency in accordance with claim 10 wherein said binder contains a butadiene-styrene-2-vinyl pyridine terpolymer polymer and water.

12. A transparency in accordance with claim 1 wherein the toner wetting agent of the second layer is optionally present in an amount of from about 5 parts by weight to about 40 parts by weight and is selected from the group consisting of (1) N,N-bis(2-hydroxy propyl) ethanolamine, (2) 3-octadecyloxy-1,2-propanediol, (3) 1-4-bis(2-hydroxyethyl) piperazine, (4) 4-8-bis(hydroxymethyl) tricyclo(5.2.1.$0^{2.6}$) decane, (5) 2,4,7,9-tetra methyl-5decyne-4,7-diol.

13. A transparency in accordance with claim 1 wherein the toner wetting agent is the alcohol 4-8-bis(hydroxymethyl) tricyclo (5.2.1.$0^{2.6}$) decane.

14. A transparency in accordance with claim 1 wherein the dry thickness of the second coating layer from about 0.5 microns to about 25 microns.

15. A transparency in accordance with claim 1 wherein the hydrophilic binder is present in an amount of from about 89 parts by weight to about 25 parts by weight, the acid salt is present in an amount of from about 5 parts by weight to about 40 parts by weight, the cationic component is present in an amount of from about 4 parts by weight to about 25 parts by weight, the luminescent component is present in an amount of from about 1 part by weight to about 5 parts by weight and the biocide compound is present in an amount of from about 1 part by weight to about 5 parts by weight.

16. A transparency in accordance with claim 15 wherein the luminescent component is a fluorescent dye or a fluorescent pigment.

17. A transparency in accordance with claim 1 wherein the dry thickness of each of the third and fourth hydrophilic coating layers is about 0.5 micron to about 25 microns.

18. A coated transparency in accordance with claim 1 wherein the biocide is optionally present in an amount of from about 1 to about 5 parts by weight and is (1) 2-bromo-4'-hydroxyacetophenone; (2) 3,5-dimethyl tetrahydro-2H-1,3,5-thiadiazine-2-thione; (3) potassium N-hydroxy methyl-N-methyl-dithiocarbamate; (4) sodium dichlorophene; (5) poly(oxyethylene(dimethylamino)-ethylene (dimethylamino) ethylene dichloride; the lightfast UV absorber compound optionally present in an amount of from about 8 parts by weight to about 0.5 part by weight is (1) poly(4-hydroxy-2,2,6,6-tetramethyl-1-piperidine ethanol/dimethylsuccinic acid); (2) 2-hydroxy-4-(octyloxy) benzo phenone; (3) poly(2-(4-benzoyl-3-hydroxy phenoxy) ethylacrylate; (4) poly(N,N-bis(2,2,6,6-tetramethyl-4-piperidinyl)-1,6-hexane diamine-co-2,4-dichloro-6-morpholino-1,3,5-triazine); (5) 1-(N-(poly(3-allyloxy-2-hydroxypropyl)-2-aminoethyl)-2-imidazolidinone; the lightfast antioxidant compound optionally present in an amount of from about 4 parts by weight to about 0.25 part by weight is (1) didodecyl-3,3'thiodipropionate, (2) ditridecyl-3,3'-thiodipropionate, (3) dicetyl-3,3'thiodipropionate, (4) 2,6-di-tert-butyl-ρ-cresol, (5) 2,6-di-tert-butyl-α-dimethyl amino-ρ-cresol; the lightfast antiozonant compound optionally present in an amount of from about 4 parts by weight to about 0.25 part by weight is (1) Nisopropyl-N'-phenyl-phenylene diamine; (2) N-(1,3-dimethylbutyl)-N'-phenylphenylene diamine; (3) N,N'-bis (1,4-dimethyl pentyl)-p-phenylene diamine, or (4) N,N'-di (2-octyl)-p-phenylenediamine.

19. A transparency in accordance with claim 1 wherein the dry thickness of the first and second layer combined is between about 1 micron to about 30 microns, and wherein the dry thickness of the third and fourth layer combined is about 1 micron to about 30 microns.

20. A coated transparency comprised of a substrate with at least about four layers, at least about two layers on one surface substrate and at least about two layers on the second surface substrate, wherein said layers are comprised of a coating layer in contact with the substrate comprised of a blend of (1) a binder, (2) a water soluble acid salt, (3) a cationic component, and (4) a biocide, and the second layer situated on top of the first coating is comprised of (1) a binder formed from a latex, (2) a toner wetting agent, (3) a lightfast UV absorber, (4) an optional lightfast antioxidant, and (5) an optional lightfastness compound; and wherein said two coatings in contact with the second, or reverse side of the substrate are comprised of a third layer comprised of a blend of (1) a hydrophilic binder, (2) a water soluble acid salt, (3) a cationic component, (4) a luminescent component, and (5) a biocide, and the fourth coating situated on top of the third coating is comprised of (1) a binder formed from a latex, (2) a toner wetting agent, and (3) a lightfastness compound.

21. A transparency in accordance with claim 20 wherein the lightfastness compound is comprised of a mixture of said UV absorber, a lightfast antioxidant compound, and a lightfast antiozonant compound, and said coatings are hydrophylic.

22. An imaging apparatus containing the transparency of claim 1.

* * * * *